United States Patent
McKnight

(10) Patent No.: US 6,829,027 B2
(45) Date of Patent: Dec. 7, 2004

(54) CONTROLLED ANGLE RETARDER

(75) Inventor: Douglas McKnight, Boulder, CO (US)

(73) Assignee: Brillian Corporation, Tempe, AZ (US)

( * ) Notice: Subject to any disclaimer, the term of this patent is extended or adjusted under 35 U.S.C. 154(b) by 0 days.

(21) Appl. No.: 10/452,414

(22) Filed: May 30, 2003

(65) Prior Publication Data

US 2003/0202141 A1 Oct. 30, 2003

Related U.S. Application Data

(62) Division of application No. 09/564,473, filed on May 3, 2000, now Pat. No. 6,587,172.

(51) Int. Cl.$^7$ ............................................ G02F 1/1335
(52) U.S. Cl. ...................................................... 349/121
(58) Field of Search ................................ 349/181, 162, 349/117, 119, 118, 121

(56) References Cited

U.S. PATENT DOCUMENTS

| | | | | |
|---|---|---|---|---|
| 5,157,523 A | * | 10/1992 | Yamagishi et al. | 349/8 |
| 5,231,521 A | * | 7/1993 | Johnson et al. | 349/18 |
| 5,371,618 A | * | 12/1994 | Tai et al. | 349/78 |
| 5,426,526 A | | 6/1995 | Yamamoto et al. | |
| 5,557,434 A | * | 9/1996 | Winker et al. | 349/117 |
| 5,867,240 A | * | 2/1999 | Crawford et al. | 349/118 |
| 5,892,612 A | * | 4/1999 | Miller et al. | 359/250 |
| 6,046,716 A | | 4/2000 | McKnight | |
| 6,181,394 B1 | * | 1/2001 | Sanelle et al. | 349/96 |
| 6,297,790 B1 | * | 10/2001 | Goode et al. | 345/87 |
| 6,380,997 B1 | * | 4/2002 | Sharp et al. | 349/119 |
| 6,476,893 B1 | * | 11/2002 | Sasaki et al. | 349/119 |

OTHER PUBLICATIONS

Shin–Tson Wu and Chiung–Sheng Wu, "Optimization of Film–Compensated Homogeneous Cells for Liquid Crystal Displays", Liquid Crystals, 1998, vol. 24 No. 6, pp. 811–818.

* cited by examiner

Primary Examiner—James Dudek
Assistant Examiner—Timothy L Rude
(74) Attorney, Agent, or Firm—Baker Botts L.L.P.

(57) ABSTRACT

A controlled angle retarder and method for making is presented. In one embodiment, the invention is a liquid crystal display. The liquid crystal display includes a liquid crystal cell having an extraordinary axis. The liquid crystal display also includes a first retarder connected to the liquid crystal cell, the first retarder having an extraordinary axis. The extraordinary axis of the first retarder is aligned at an angle to the extraordinary axis of the liquid crystal cell; the angle is sufficient to produce a desired effective retardance of the first retarder within the display different from a specified retardance of the first retarder.

The invention in an alternate embodiment is a method of making a liquid crystal display (LCD). The method includes measuring a retardance of a retarder. The method also includes calculating an alignment angle of the retarder such that the retarder will have a desired effective retardance, in combination with another optical element in the LCD, which is different from the retardance measured for the retarder. The method further includes optically coupling the retarder to a liquid crystal cell in an alignment using the alignment angle previously calculated, the alignment angle used to adjust an angle between an extraordinary axis of the retarder and an extraordinary axis of the liquid crystal cell.

The invention in another alternate embodiment is a method of making a liquid crystal combination. The method includes connecting a retarder to a liquid crystal cell loosely. The method also includes measuring a combined retardance of the retarder and liquid crystal cell. The method further includes determining whether the combined retardance is suitable and adjusting an alignment angle of the retarder to the liquid crystal cell.

20 Claims, 4 Drawing Sheets

CONTROLLED ANGLE RETARDER

CROSS-REFERENCES TO RELATED APPLICATIONS

This is a divisional of application Ser. No. 09/564,473, filed May 3, 2000, now U.S. Pat. No. 6,587,172 B1, issued Jul. 1, 2003.

BACKGROUND OF THE INVENTION

The invention generally relates to construction of optics and more particularly to liquid crystal displays.

DESCRIPTION OF THE RELATED ART

In a liquid crystal display, the display can be controlled electrically to vary between two predetermined levels of transparency. At one level of transparency, the liquid crystal display is nearly transparent, resulting in a light state. At the second level of transparency, the liquid crystal display is nearly opaque, resulting in a dark state.

The liquid crystal in a liquid crystal cell or display is encased in a relatively rigid material which gives it shape. The liquid crystal in a liquid crystal display has an extraordinary axis which has associated with it an extraordinary index of refraction (usually high), and an ordinary axis, which usually has associated with it an ordinary index of refraction lower than the extraordinary index of refraction. When light transmits through the liquid crystal, the rate at which the light passes through the liquid crystal depends on the polarization of the light. Light polarized along the ordinary axis of the liquid crystal passes through at a speed consistent with the ordinary index of refraction. Light polarized along the extraordinary axis of the liquid crystal passes through at a speed consistent with the extraordinary index of refraction. Light polarized such that it travels between the two axes has a component that travels along the ordinary axis and a component that travels along the extraordinary axis.

In the light state, the phase difference between light traveling along the ordinary axis and light traveling along the extraordinary axis results in a final polarization state that is transmitted. In the dark state, the phase difference between light traveling along the ordinary axis and light traveling along the extraordinary axis results in a polarization state that is blocked. The difference between the two states arises from a change in the orientation of the liquid crystal molecules resulting from a voltage applied to the liquid crystal.

The intensity of the light transmitted through a liquid crystal cell, such as an electrically controlled birefringence (ECB) cell, between crossed polarizers, may be expressed roughly as:

$$I = I\max\sin^2(2\Pi\Delta nd/\lambda)$$

$\lambda$ represents the wavelength of the light in question, $\Delta$ is the difference in refractive indices of the LC (also called the birefringence), d is the thickness of the LC layer. It will become apparent that the dark state results when $\Delta nd$ is zero. $\Delta nd$ is an expression of the phase change induced due to the difference between the two indices of refraction of the liquid crystal, and the distance the light travels in the liquid crystal.

The effective $\Delta n$ of the LC cell can be controlled by an applied voltage signal. By forming electrodes on one or both surfaces of the LC cell, individual pixel regions can be controlled to make a display. It should be understood that an LC display uses a special case of the LC cell, with individual pixels being addressable due to the layout of electrodes.

Unfortunately, as $\Delta n$ approaches 0 in an LC, it changes approximately in proportion to 1/V, where V is the voltage applied to the liquid crystal. Therefore, achieving a $\Delta nd$ value of close to zero may require an excessively high voltage. As a result, a retarder is added to the liquid crystal cell, as illustrated in FIG. 1.

FIG. 1 illustrates a prior art embodiment of a retarder and liquid crystal (as a liquid crystal cell or display) combination. The polarizer 110 causes the light passing through it to be polarized along a first axis which may be referred to as a zero degree axis. The retarder 120 has an extraordinary (slow) axis similar to the liquid crystal, and that extraordinary axis is aligned at a −45 degree angle from the zero degree axis of the polarizer 110. Placed next to the retarder 120 is the liquid crystal 130, which has its extraordinary axis aligned at a +45 degree angle from the zero degree axis of the polarizer 110. The retarder has a fixed value for $\Delta nd$ which may be denoted $\Gamma$. Therefore, the intensity of light passing along the path illustrated by ray 140 after passing through the analyzing polarizer 150 may be calculated as approximately:

$$I = I\max\sin^2(2\Pi(\Delta nd - \Gamma)/\lambda)$$

By introducing the retarder, the voltage V applied to the liquid crystal may be adjusted to a more desirable value because the display can now give a nearly perfect dark state when $\Delta nd$ of the display is not zero, thus allowing the 1/V relationship mentioned earlier to be satisfied more easily. Note that the polarizers such as a polarizer 110 and analyzing polarizer 150 may be implemented with a variety of materials (thus forming polarizing elements) and may be coupled to the combination optically rather than physically.

However, it will be appreciated that in some circumstances, finding a retarder that fits the exact specifications required for the above relationship may be difficult. Moreover, retarders often have significant variations in the value of $\Delta nd$ within the manufacturer's specifications for the retarders. Therefore, even when the correct value of $\Delta nd$ is expected, it may not be achieved.

SUMMARY OF THE INVENTION

A controlled angle retarder and method for making is presented. In one embodiment, the invention is a liquid crystal display. The liquid crystal display includes a liquid crystal cell having an extraordinary axis. The liquid crystal display also includes a first retarder connected to the liquid crystal cell, the first retarder having an extraordinary axis. The extraordinary axis of the first retarder is aligned at an angle to the extraordinary axis of the liquid crystal cell; the angle is sufficient to produce a desired effective retardance of the first retarder within the display different from a specified retardance of the first retarder.

The invention in an alternate embodiment is a method of making a liquid crystal display (LCD). The method includes measuring a retardance of a retarder. The method also includes calculating an alignment angle of the retarder such that the retarder will have a desired effective retardance, in combination with another optical element in the LCD, which is different from the retardance measured for the retarder. The method further includes optically coupling the retarder to a liquid crystal cell in an alignment angle previously calculated, the alignment angle used to adjust an angle between an extraordinary axis of the retarder and an extraordinary axis of the liquid crystal cell.

The invention in another alternate embodiment is a method of making a liquid crystal combination. The method includes connecting a retarder to a liquid crystal cell loosely. The method also includes measuring a combined retardance of the retarder and liquid crystal cell. The method further includes determining whether the combined retardance is suitable and adjusting an alignment angle of the retarder to the liquid crystal cell.

BRIEF DESCRIPTION OF THE DRAWINGS

The present invention is illustrated by way of example and not limitation in the accompanying figures.

DETAILED DESCRIPTION OF THE INVENTION

Figure 1:
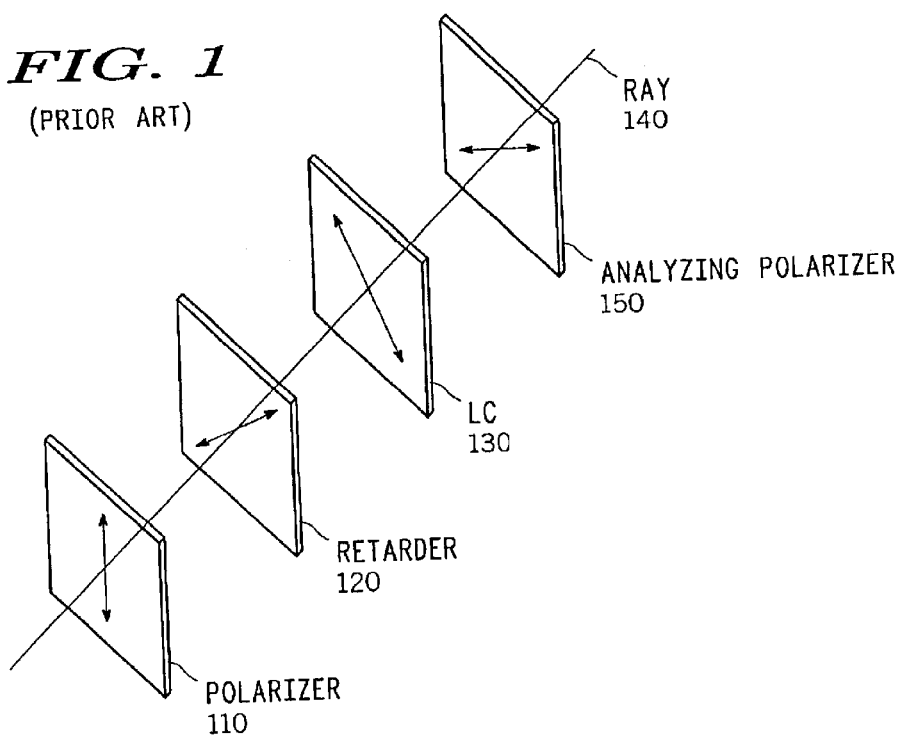
FIG. 1 illustrates a prior art embodiment of a retarder and liquid crystal cell combination.

A method and apparatus for a controlled angle retarder is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In general this invention allows a retarder of a certain value to be tuned to yield an effective retardance that is smaller than its intrinsic (or specified or manufactured) value. This effective retardance is the retardance resulting from the presence of the retarder in an optical system, and results from the interaction of light with the retarder and another part or other parts of the optical system. Thus, this process of tuning does not necessarily change the retarder so much as it utilizes the retarder to achieve a retardance different from the intrinsic retardance of the retarder. The other part or parts of the optical system may include a polarizer (or polarizing element), a liquid crystal cell, or other optical elements for example, and the retarder may be physically connected or optically coupled to the other part or parts of the optical system.

This invention may be useful because it may give an extra degree of freedom to the designer. The designer may be able to optimize certain liquid crystal aspects of the system, and then subsequently match a retarder which may be manufactured to a value which is chosen for completely different reasons, such as ease of manufacture, tolerance requirements, or simply that it is an off-the-shelf product.

One good example of this is where the retarder may be made by combining two retarders having larger value retardances. In this situation these two retarders can be laminated together oriented with their extraordinary axes at 90 degrees to each other. The resulting in-plane retardation is the difference of the in-plan retardation of the two sheets. For example, laminating a 275 nm retarder to a 230 nm retarder with their axes crossed yields a 45 nm retarder. There are at least two reasons why this may be done. One is to obtain a low-valued in-plane retardation from existing off-the-shelf components. The other reason is that crossing two uniaxial retarders as described above yields a component that is similar to a biaxial retarder with negative Z retardation. This can be understood qualitatively by considering that both the uniaxial films have their extraordinary axes in the plane of the film. Polarized light propagating normal to the film always sees the effect of the extraordinary axis of one of the films, or a mixture of both films in a proportion that is determined by its polarization direction. There is no polarization direction that allows the light to see only the ordinary refractive index of the material. Light propagating close to parallel to the plane of the combined retarder film can, however, see a refractive index close to the ordinary index of the material (depending on its polarization direction). This behavior is similar to that of a biaxial retarder with negative Z retardation. This similarity can be verified quantitatively with a commercial LC device simulation program such as DIMOS, available from Autronic Melchers.

It is known that negative Z retardation can be used to help compensate some LC displays for improved off-axis performance. For this reason the designer may wish to choose a combination of crossed uniaxial retarders not only to yield a certain in-plane retardation, but also to yield a certain effective negative Z retardation. For example, crossing 275 nm with 230 nm and crossing 185 nm with 140 nm both yields 45 nm of in-plane retardation. There is no difference in the effect these two structures would have on the polarization of the light propagating on-axis (normal to the film), but there is a difference in their off-axis performance due to the second example having smaller equivalent negative Z retardation. For this reason the designer may wish to choose to cross two (or more) films to achieve a certain equivalent Z retardation and simultaneously a certain in-plane retardation. In practice there are a limited number of retarder values to choose from, and so using this invention to gain an extra degree of design freedom is very useful. Considering, again, the example above. If the crossed combination of 185 nm and 140 nm gave better viewing angle performance than 275 nm and 230 nm, but if indeed the closest values that could be found were 190 nm, and 135 nm, then the resulting in-plane retardation would be 55 nm. By choosing the angle correctly this combination could be used as a close approximation to a 45 nm retarder, or indeed the 25 nm retarder from the earlier example. The combination of two or more retarders may be thought of, analyzed as and generally handled as though it were a single retarder having a retardance equal to the effective retardance of the combination.

Figure 2A:
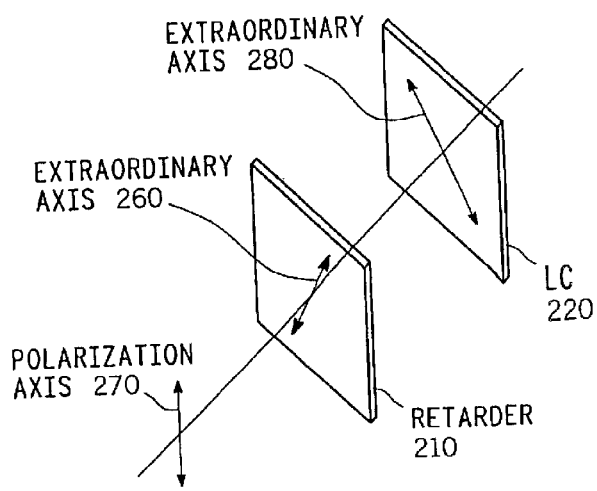
FIG. 2a illustrates a retarder.

FIG. 2a illustrates a retarder 210 and a liquid crystal (LC) cell 220. The retarder 210 has an extraordinary axis 260, the LC cell 220 has an extraordinary axis 280, and the axis 260 and the axis 280 are perpendicular to each other. Shown for perspective is the polarization transmission axis 270 of the polarizer 110 as it would be aligned in the embodiment of FIG. 1. In this illustration, the extraordinary axis 260 is aligned in the traditional location of −45 degrees relative to the polarization axis 270. It will be appreciated that this illustration only shows an extraordinary axis on the x-y plane of the retarder 210, and that a biaxial retarder may also have a z-axis retardance which does not affect the present invention.

Figure 2B:
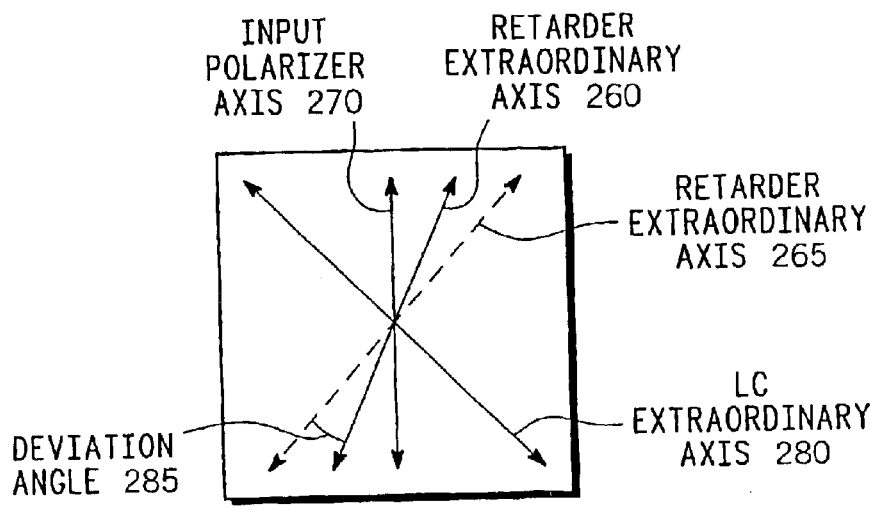
FIG. 2b illustrates a top view of an embodiment of a retarder and liquid crystal cell combination.

FIG. 2b illustrates an end view of an embodiment of a retarder and liquid crystal cell combination. In this embodiment, the extraordinary axis 280 of the liquid crystal cell 220 is placed at the traditional +45 degree location relative to the zero degree axis 270 of the polarizer. However, the extraordinary axis 260 of the retarder 210 is placed at an angle different from the −45 degree location used for the retarder 120 of FIG. 1. The −45 degree location is illustrated as extraordinary axis 265. Instead, the extraordinary axis of the retarder is aligned at an angle appropriate to supply an effective desired retardance different from the retardance specified (or actually manufactured) by the manufacturer of retarder 120. The angle between the extraordinary axis 260 and the extraordinary axis 265 (the −45 degree location) is the deviation angle 285.

In one embodiment, a retardance of 25 nm (a retarder with a manufactured or actual $\Delta nd$ of 25 nm) is desired. However, presently, manufacturers of retarders tend to have difficulty manufacturing retarders with a value of 25 nm. Retarders often have a tolerance of +/−7 nm, so a retarder with a value of 25 nm may vary in retardance between 18 nm and 32 nm, which may result in too much variation to make design manufacturable.

Fortunately, theoretical calculations utilizing Jones calculus and experimental observations indicate that use of a retarder with a larger specified value and a different alignment of its extraordinary axis may effectively mimic the effects of a 25 nm retarder. In particular, a 40 nm retarder with its extraordinary axis aligned at about −25 degrees relative to the zero degree axis of the polarizer results in a system performance that closely approximates the performance of the system with the 25 nm retarder in the traditional orientation. We can say that we have arranged for the 40 nm retarder to have an effective retardance of 25 nm. Furthermore, the −25 degrees location is not highly sensitive, rotating the 40 nm retarder by 5 degrees in either direction will have a slight effect on the effective retardance, but does not change it by more than 2 nm, which is still within an acceptable tolerance for some applications.

Figure 3:
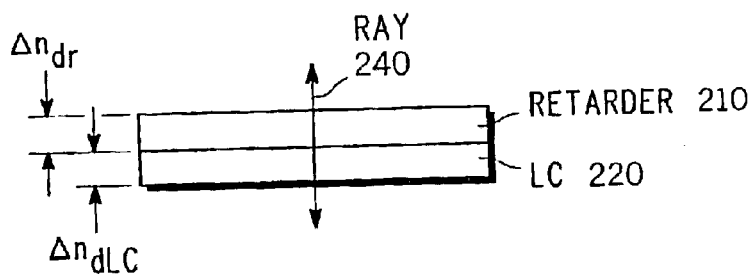
FIG. 3 illustrates a side view of an embodiment of a retarder and liquid crystal cell combination.

FIG. 3 illustrates a side view of an embodiment of a retarder and liquid crystal cell combination. Ray 240 encounters a phase change $\Delta ndR$ traveling through the retarder 210 and a phase change $\Delta ndLC$ traveling through the liquid crystal cell. When $\Delta ndLC$ is equal to, and oriented at right-angles to, $\Delta ndR$, the polarization of ray 240 is unchanged and the ray can be effectively blocked by an analyzing polarizer. When $\Delta ndLC$ and $\Delta ndR$ differ by a half wavelength of light, efficient polarization rotation results, and most or all of the light of ray 240 passes through the crossed analyzing polarizer subsequent to the retarder and liquid crystal combination. Variations in $\Delta ndLC$ may be used to produce a gray-scale or variation in the intensity of ray 240 coming out of the retarder and liquid crystal combination.

Figure 4:
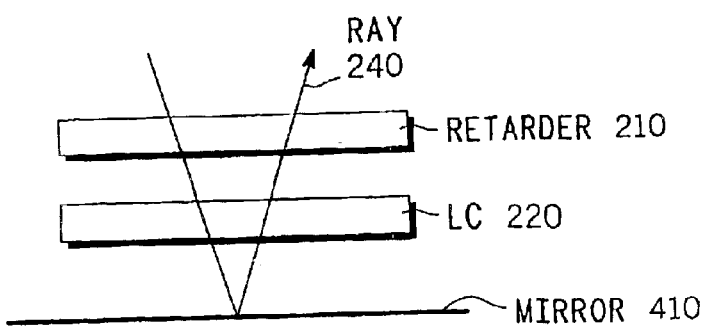
FIG. 4 illustrates a side view of an embodiment of a retarder and liquid crystal cell combination with a reflective design.

FIG. 4 illustrates a side view of an embodiment of a retarder and liquid crystal cell combination with a reflective design. It will be appreciated that when ray 240 passes through the retarder and liquid crystal combination it bounces off of mirror 410 and passes back through the combination again. Even though the ray passes through the combination twice, the combination may be built in the same manner as the combination illustrated for a transmissive display in FIG. 2b. As will be appreciated, the values of retardation of the liquid crystal cell and the retarder should be changed to be appropriate for the double pass. For instance, in a crossed polarizer configuration the combined retardance for the bright state could be close to a quarter-wave, rather than a half-wave for the transmissive case. Furthermore, it will be appreciated that the retarder in any transmissive LC embodiment may be split into two or more retarding layers sandwiched on either side of the liquid crystal.

Figure 5:
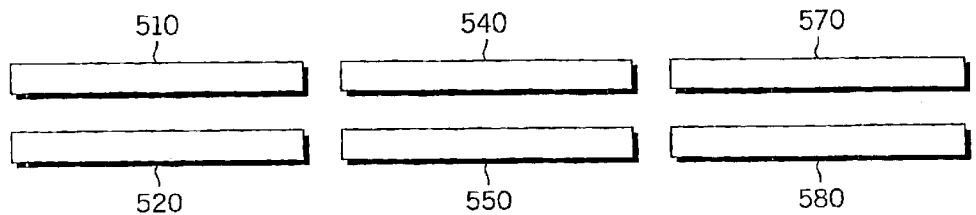
FIG. 5 illustrates a side view of an embodiment of a set of three retarder and liquid crystal cell combinations such as may be used in a three-color display.

FIG. 5 illustrates a side view of an embodiment of a set of three retarder and liquid crystal cell combinations such as may be used in a three-color display. Retarder 510 and liquid crystal cell 520 are optimized for green light in one embodiment. Similarly, retarder 540 and liquid crystal cell 550 are optimized red light, while retarder 570 and liquid crystal cell 580 are optimized for blue light. The same retarder may have different retardance values for each wavelength, and specifications normally include a curve of retardance relative to wavelength. Therefore, a different alignment angle may be appropriate for each of the red (540), green (510), and blue (570) retarders, depending on the properties of the LC panels. A light source (not shown) may be split into three components, and those components may be routed through appropriate retarder and liquid crystal cell combinations to create a RGB display. It will be appreciate that by time-sequencing red, green, and blue light sources, a similar RGB effect may be produced with a single retarder and liquid crystal cell combination, but clearly in this case only a single angle can be used, and so any dispersive mismatches between the LC cell and the retarder have to be compensated with other means, such as voltage tuning.

Figure 6:
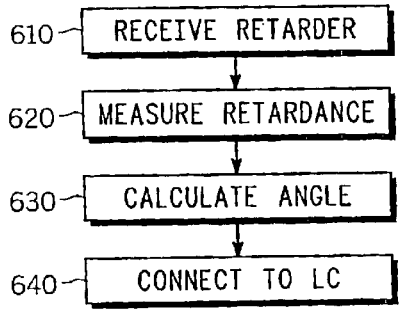
FIG. 6 illustrates an embodiment of a method of making a retarder and liquid crystal cell combination.

FIG. 6 illustrates an embodiment of a method of making a retarder and liquid crystal cell combination. At block 610, a retarder is received. At block 620, the retardance of the retarder is measured. The retardance actually manufactured may vary from the specified retardance (either within or outside the specified range), and the retardance need not vary uniformly for varying wavelengths of light. As such, the measurement of block 620 may be performed for a single (often predetermined) wavelength, or for a set of wavelengths. At block 630, an alignment angle that will result in a desired effective retardance from the retarder is calculated. At block 640, the retarder is connected to the liquid crystal cell at the calculated angle, within manufacturing tolerances.

Figure 7:
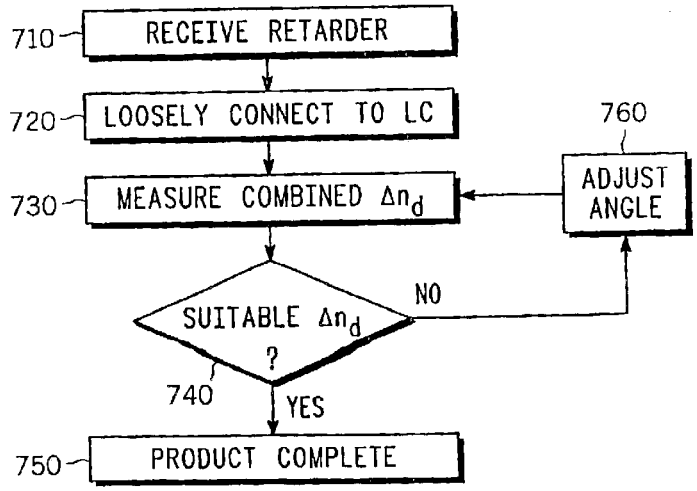
FIG. 7 illustrates an alternate embodiment of a method of making a retarder and liquid crystal cell combination.

FIG. 7 illustrates an alternate embodiment of a method of making a retarder and liquid crystal cell combination. At block 710, a retarder is received. At block 720, the retarder is loosely connected to the liquid crystal cell. At block 730, the combined $\Delta nd$ of the retarder and the liquid crystal cell is measured, and this may include measuring both a light state $\Delta nd$ and a dark state $\Delta nd$. At block 740, it is determined whether the $\Delta nd$ value is suitable (such as suitable for both a light and a dark state for example). If the $\Delta nd$ value is unsuitable (such as out of a manufacturing tolerance for example), the angle between the extraordinary axis of the retarder and the extraordinary axis of the liquid crystal cell is adjusted at block 760, and the Δnd values are measured again at block 730. If the Δnd value is suitable, the liquid crystal cell and retarder product is completed by tightly affixing (or permanently adhering) the retarder to the liquid crystal cell.

Figure 8:
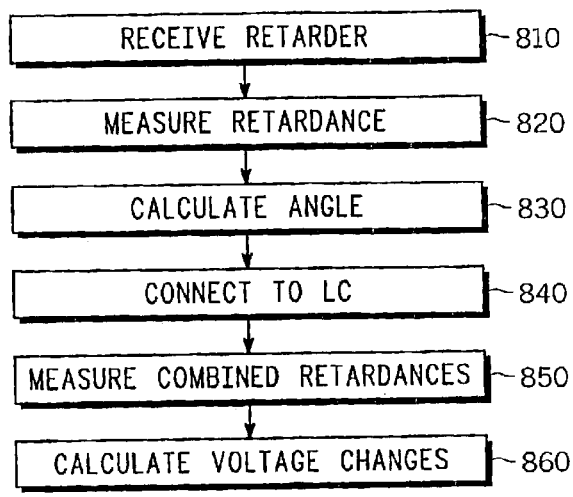
FIG. 8 illustrates an alternate embodiment of a method of making a retarder and liquid crystal cell combination.

FIG. 8 illustrates an alternate embodiment of a method of making a retarder and liquid crystal cell combination. At block 810, a retarder is received. At block 820, the retardance of the retarder is measured. At block 830, the alignment angle for the retarder is calculated. At block 840, the retarder is connected to a liquid crystal cell. At block 850, the combined retardances of the retarder and liquid crystal cell are measured across several wavelengths. At block 860, the bias voltages useful for a good dark and bright state for each wavelength are determined through a combination of calculation and observations from block 850.

Figure 9A:
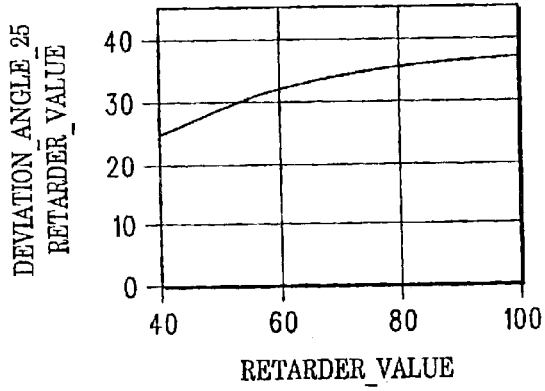
FIG. 9a is a graph of a retardance in relations to angle of the extraordinary axis of the retarder, illustrating the angle needed to result in an effective retardance of 25 nm.

FIG. 9a is a graph of retardance in relation to the deviation angle of the extraordinary axis of the retarder for an effective retardance of 25 nm. In particular, this is a plot of the angle that the retarder should be rotated from the prior art direction as a function of retarder value. This plot shows the angle that the retarder should be rotated through to make it behave approximately like a 25 nm retarder. This angle is shown here for retarders between 40 and 100 nm. The calculation is for 520 nm light. As is apparent, the various retarders have angles that achieve a 25 nm effective retardance.

Figure 9B:
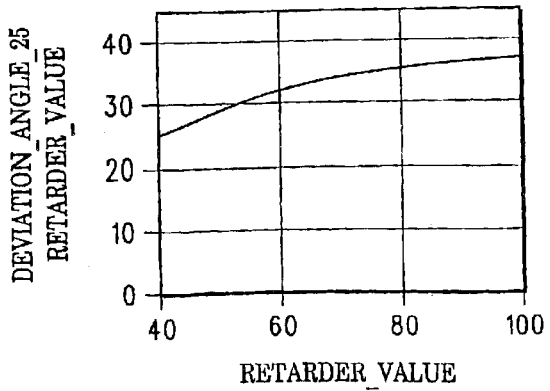
FIG. 9b is a graph of retardance in relation to angle of the extraordinary axis of the retarder, illustrating the angle needed to result in an effective retardance of 40 nm.

Similarly, FIG. 9b is a graph of retardance in relation to the deviation angle of the extraordinary axis of the retarder for an effective retardance of 40 nm. In particular, this is a plot of the angle that the retarder should be rotated from the prior art direction as a function of the retarder value. This plot shows the angle that the retarder should be rotated through to make it behave approximately like a 40 nm retarder. This angle is shown here for retarders between 40 and 100 nm, using 520 nm light. It can be seen that when the desired value and the retarder value are the same (40 nm here) the deviation angle is zero, as expected. The various retarders have angles that achieve a 40 nm effective retardance, and the deviation angle for a 40 nm retarder is zero. Moreover, these graphs indicate that the higher the value specified for the retarder, the more sensitive to the alignment angle the effective retardance is, and conversely the less sensitive to retarder value the effective retardance is.

It will be appreciated that the method and apparatus described above may be used in conjunction with display systems as described in U.S. Pat. No. 6,046,716 entitled "DISPLAY SYSTEM HAVING ELECTRODE MODULATION TO ALTER A STATE OF AN ELECTRO-OPTIC LAYER" issued Apr. 4, 2000 which is hereby incorporation herein by reference and as described in U.S. Pat. No. 5,426,526 entitled "REFLECTION TYPE SINGLE CRYSTAL SILICON SUBSTRATE LIQUID CRYSTAL DISPLAY DEVICE AND SYSTEM" issued Jun. 20, 1995 and which is hereby incorporated herein by reference. In one embodiment, the display system resembles the embodiment illustrated in FIG. 4, and utilizes an electrode control surface for the liquid crystal display as a mirror. Furthermore, it will be appreciated that the components of a liquid crystal display may be optically coupled or otherwise connected in a variety of different ways while still incorporating the method or apparatus of a controlled angle retarder.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 5 may be integrated into components, or may be subdivided into components. Moreover, the blocks of FIGS. 6–8 represent portions of method which, in some embodiments, may be reordered or may be organized in parallel rather than in a linear step-wise fashion. The present specification and figures are accordingly to be regarded as illustrative rather than restrictive.

What is claimed is:

1. A method of making a liquid crystal display (LCD), the method comprising:

measuring a retardance of a retarder;

calculating an alignment angle of the retarder such that the retarder will have a desired effective retardance which is less than the retardance measured for the retarder;

optically coupling the retarder to a liquid crystal cell in an alignment using the alignment angle previously calculated, the alignment angle used to adjust an angle between an extraordinary axis of the retarder and an extraordinary axis of the liquid crystal cell.

2. The method of claim 1 further comprising:

measuring a set of combined retardances of the liquid crystal cell and the retarder; and determining a set of bias voltages from the set of combined retardances.

3. The method of claim 2 wherein:

the set of combined retardances correspond to bright and dark states for a set of predetermined wavelengths of light.

4. The method of claim 1 further comprising:

measuring a combined retardance of the liquid crystal cell and the retarder; and determining a bias voltage from the combined retardance.

5. The method of claim 4 further comprising:

receiving the retarder.

6. The method of claim 4 wherein:

the combined retardance corresponds to bring to a dark state for a predetermined wavelength of light.

7. The method of claim 1 wherein:

the desired effective retardance being an effective retardance of the retarder as measured in combination with an optical element in the LCD, the retarder optically coupled to the optical element.

8. The method of claim 7 wherein:

the optical element being a polarizing element.

9. The method of claim 1 wherein: the first retarder is a biaxial retarder.

10. A method of making a liquid crystal combination comprising:

connecting a retarder to a liquid crystal cell loosely;

measuring a combined retardance of the retarder and liquid crystal cell which is less than the retardance of the retarder alone;

determining whether the combined retardance of the retarder and the liquid crystal cell is within a desired range; and adjusting an alignment angle of the retarder to the liquid crystal cell until the combined retardance is within the desired range.

11. The method of claim 10 further comprising:

completing connection of the retarder to the liquid crystal cell when the combined retardance is within the desired range.

12. The method of claim 11 further comprising:

receiving the retarder.

13. The method of claim 11 wherein:

the alignment angle resulting in the combined retardance being within the desired range is significantly different from an angle of 90 degrees between an extraordinary axis of the retarder and an extraordinary axis of the liquid crystal cell.

14. The method of claim 11 wherein:

an effective retardance of the retarder in the combined retardance is less than a specified retardance of the retarder.

15. The method of claim 14 further comprising:

coating the liquid crystal combination with an anti-reflective coating.

16. A method of making a liquid crystal display (LCD), the method comprising:

providing a liquid crystal cell having an extraordinary axis;

optically coupling a first retarder to the liquid crystal cell, the first retarder having an extraordinary axis aligned at an angle to the extraordinary axis of the liquid crystal cell, the angle sufficient to produce a desired effective retardance of the first retarder within the display less than a specified retardance of the first retarder;

optically coupling a first polarizing element to the display;

coupling an adjustable voltage source to the liquid crystal cell for biasing the liquid crystal cell;

configuring a light source to supply light in a sequence of wavelengths to the liquid crystal display; and sequentially adjusting the voltage source among a set of voltages suitable for the wavelengths of the sequence of wavelengths of light of the light source.

17. The method of claim 16 wherein: the first retarder is a retarder which is initially constructed from two separate retarders such that the effective retardation is less than either of the separate retardations.

18. The method of claim further comprising: connecting a second retarder to the liquid crystal cell, the second retarder having an extraordinary axis, the extraordinary axis of the second retarder aligned at an angle to the extraordinary axis of the liquid crystal cell, the angle sufficient to produce a desired effective retardance of the second retarder different less than a specified retardance of the second retarder.

19. The method of claim 16 wherein: the effective retardance of the first retarder is about 25 nm and the specified retardance of the first retarder is about 40 nm.

20. The method of claim 16 further comprising: optically coupling a second polarizing element to the liquid crystal cell, the second polarizing element configured as an analyzing polarizer.

* * * * *